United States Patent [19]

Sasaki et al.

[11] Patent Number: 4,761,597

[45] Date of Patent: Aug. 2, 1988

[54] METHOD AND SYSTEM FOR CONTROLLING SYNCHRONOUS DRIVE SYSTEMS

[75] Inventors: Yoshinari Sasaki, Numazu; Yasuo Ozaki, Shizuoka, both of Japan

[73] Assignee: Toshiba Kikai Kabushiki Kaisha, Tokyo, Japan

[21] Appl. No.: 99,117

[22] Filed: Sep. 21, 1987

Related U.S. Application Data

[63] Continuation of Ser. No. 5,376, Jan. 12, 1987, abandoned.

[30] Foreign Application Priority Data

Feb. 14, 1984 [JP] Japan .................................. 59-25566

Feb. 14, 1984 [JP] Japan .................................. 59-25567

[51] Int. Cl.[4] .............................................. G05B 11/32

[52] U.S. Cl. .................................... 318/625; 318/632; 318/85; 318/615

[58] Field of Search ................. 318/632, 85, 625, 610, 318/615, 616, 617

[56] References Cited

U.S. PATENT DOCUMENTS 3,906,323 9/1975 Ono et al. ....................... 318/625 X 3,906,327 9/1975 O'Callaghan ................... 318/625 X 4,087,731 5/1978 Rhoades ............................. 318/625

4,390,942 6/1983 Keizer ............................. 318/610 X 4,408,148 10/1983 Herzog ............................... 318/610

4,466,054 8/1984 Shigemasa et al. ............. 318/610 X

FOREIGN PATENT DOCUMENTS 1524971 9/1978 United Kingdom .

*Primary Examiner*—Benjamin Dobeck

*Attorney, Agent, or Firm*—Koda and Androlia

[57] ABSTRACT

In a system for controlling a synchronous drive system suitable for use in a machining center of the type comprising a first and second servosystems wherein it is necessary to cause the outputs of the first and second servosystems to coincide with each other, there are provided a target setter for supplying a target value to the first and second servosystems, a compensation system inputted with the difference between the outputs of the first and second servosystems, and circuit means for inputting the output of the compensation system to the second servosystem. The compensation system is constituted by one, two or three of a proportionality element, a differentiating element, and an integrating element.

4 Claims, 10 Drawing Sheets

1
1a
P
Q
3

×10⁻² θd
0.15
0.10
0.05
IIIs
Vs
0.0
0.1
0.2
0.3
0.4
0.5
TIME(sec)

×10⁻² θd
0.012
0.008
0.004
IIIR
VR
0.0
0.1
0.2
0.3
0.4
0.5
TIME(sec)

METHOD AND SYSTEM FOR CONTROLLING SYNCHRONOUS DRIVE SYSTEMS

BACKGROUND OF THE INVENTION

This is a continuation of application Ser. No. 005,376, filed Jan. 12, 1987, now abandoned.

This invention relates to a method of and system for controlling a synchronous drive system which are used in a machining center, for example, and required to be accurately driven synchronously.

FIG. 1A shows a front view of a machining center capable of effecting various machining operations by automatically exchanging various types of tools, and FIG. 1B shows a side view of the machining center shown in FIG. 1A. As shown, drive sources in the form of electric motors 2 and 3 are connected to the opposite sides of the drive shaft *1a* of a worktable 1. The worktable 1 can be smoothly rotated in a direction of P-Q shown in FIG. 1B without accompanying unbalance by synchronously operating a first servosystem including motor 2 and a second servosystem including motor 3.

Where the controlled object is heavy and large like the worktable 1, for the purpose of smoothly and stably operating the worktable it is advantageous to drive the same from both sides thereof with synchronously operated two servosystems. When two servosystems are controlled independently, the outputs of the two servosystems become different, thus failing satisfactory control of the worktable due to the difference in the pitches of screws of the servosystems, back lashes of the gears thereof or difference in the response characteristics of the two servosystems.

SUMMARY OF THE INVENTION

It is an object of this invention to provide a novel method and apparatus capable of satisfactorily controlling a synchronous drive system constituted by two servosystems.

Another object of this invention is to provide a novel method and apparatus capable of causing the outputs of two servosystems of a synchronous drive system to quickly coincide with each other.

Still another object of this invention is to provide an improved method and apparatus capable of following up a ramped variation of a target value.

According to one aspect of this invention, there is provided a system for controlling a synchronous drive system of the type comprising a first servosystem and a second servosystem wherein it is necessary to cause outputs of the first and second servosystems to coincide with each other, characterized in that there are provided means for supplying a target value of a servosystem to the first and second servosystems respectively, a compensation system inputted with a difference between the outputs of the first and second servosystems, and means for inputting an output of the compensation system to the second servosystem.

According to another aspect of this invention, there is provided a method of controlling a synchronous drive system including a first servosystem and a second servosystem wherein it is necessary to cause outputs of the first and second servosystems to coincide with each other, characterized by the steps of providing a compensation system; applying a target value of a servosystem to the first and second servosystems; inputting a difference between the outputs of the first and second systems to the compensation system, and inputting an output of the compensation system to the second servosystem.

DESCRIPTION OF THE PREFERRED EMBODIMENTS

Figure 1A:
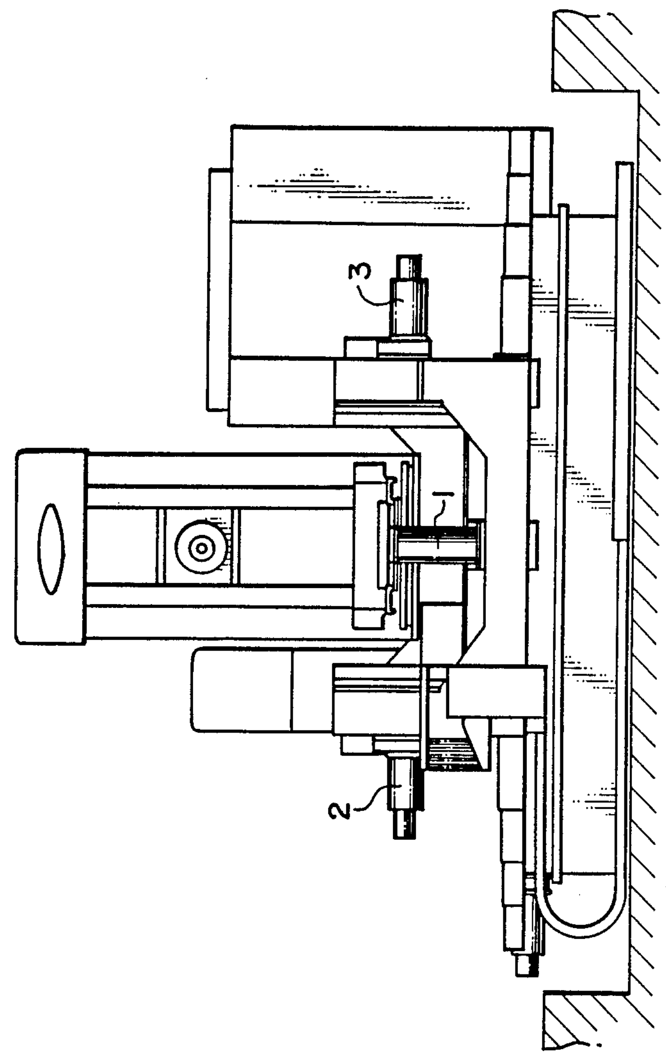
FIG. 1A is a front view of a machining center to which the invention is applicable.
Figure 1B:
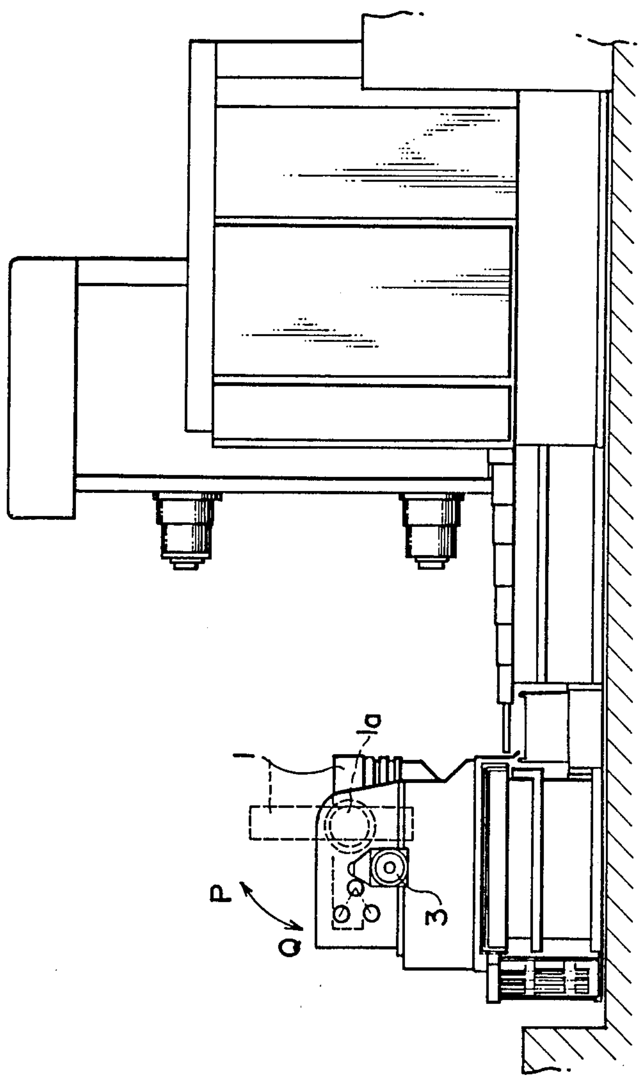
FIG. 1B is a side view of the machining center shown in FIG. 1A.
Figure 2:
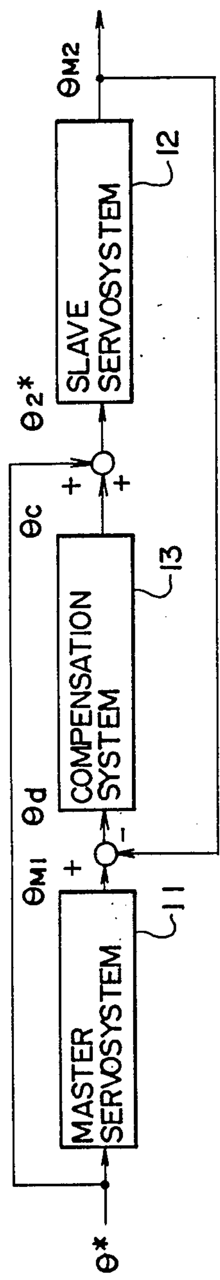
FIG. 2 is a block diagram showing a control system embodying the invention.

In one embodiment of the control system shown in FIG. 2, a target value $\theta^*$ is inputted to a master servosystem 11 acting as a first servosystem and to a slave servosystem 12 acting as a second servosystem. The difference $\theta_d$ between the output $\theta_{M1}$ of the master servosystem 11 and the output $\theta_{M2}$ of the slave servosystem 12 is inputted to a compensation system 13, and the output $\theta_c$ thereof is supplied to the slave servosystem 12. More particularly, a series compensation is effected for the slave servosystem 12 by taking the output $\theta_{M1}$ of the master servosystem 11 as a target value, while the output $\theta_{M1}$ of the master servosystem is subjected to a positive feedback control caused by a true target value $\theta^*$ to be followed. Although not shown, both master servosystem 11 and the slave servosystem 12 are provided with feedback systems.

Figure 3:
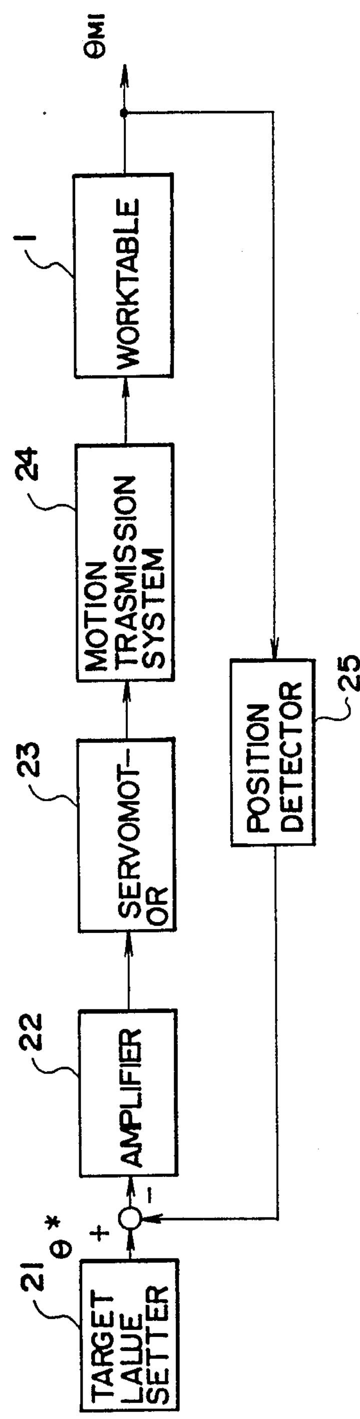
FIG. 3 is a block diagram showing a master servosystem utilized in this invention.

A case wherein the invention is applied to the rotation of the worktable 1 of a machining center will be described as follows. Suppose now that the master servosystem 11 has a typical construction as shown in the block diagram shown in FIG. 3 utilizing a servomotor 23. With this construction, the difference between an angular target value $\theta^*$ of the worktable set by a target value setter 21 and an actual angle $\theta_{M1}$ of the worktable 1 detected by such position detector 25 as a potentiometer, resolver or the like is amplified by an amplifier 22, and the amplified voltage is applied to the servomotor 23 which generates a torque proportional to the current flowing therethrough, the generated torque being used to rotate the worktable 1 through a motion transmission system 24.

Since amplifier 22, position detector 25 and servoamplifier 23 have sufficiently faster response speeds than the motion of the worktable 1, their performances can be deemed as constants not accompanying any delay, so that the master servosystem 11 operates as a secondary system due to the inertia of the worktable 1 with the result that the transfer function $G_1(s)$ between the target value $\theta^*$ and the actual angle $\theta_{M1}$ can be expressed by the following equation (1):

$$G_1(s) = \frac{\beta_1}{s^2 + \alpha_1 s + \beta_1} \quad (1)$$

in which s: Lapace's operator $\alpha_1$ and $\beta_1$: constants.

Since the constant $\beta_1$ in the denominator and the numerator are the same, this master servosystem is the so-called I type control system capable of following up the stepped variation of the target value $\theta^*$ without a steady deviation.

Since the slave servosystem 12 is constructed similar to the master servosystem 11, the transfer function $G_2(s)$ between the target value $\theta^*$ of the worktable 1 and the actual angle $\theta_{M2}$ thereof detected by the position detector 25 of the slave servosystem 12 is expressed by the following equation:

$$G_2(s) = \frac{\beta_2}{s^2 + \alpha_2 s + \beta_2} \quad (2)$$

where $\alpha_2$ and $\beta_2$: constants.

Figure 4:
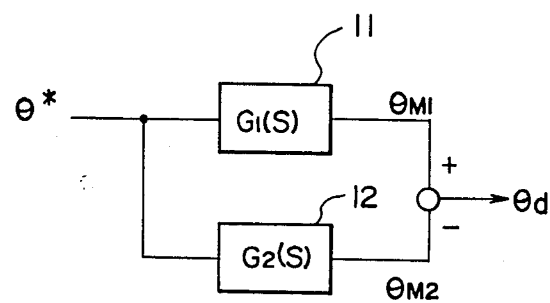
FIG. 4 is a block diagram showing a case not using compensating means of the synchronous drive system.
Figure 5A:
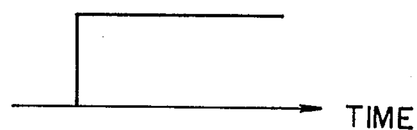
FIG. 5A is a graph showing a stepped variation of a target value.
Figure 5B:
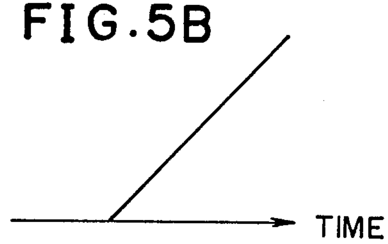
FIG. 5B is a graph showing a gradual or ramp variation of the target value.

In the master servosystem 11 and the slave servosystem 12 of the type described above, let us assume that various parameters have the values of $\alpha_1 = \alpha_2 = 80$, $\beta_1 = 1440$ and $\beta_2 = 1200$. Then for the purpose of investigating the response of the deviation between the output $\theta_{M1}$ of the master servosystem 11 and the output $\theta_{M2}$ of the slave servosystem 12 with reference to the target value $\theta^*$ where no compensation is made as shown in FIG. 4, the target value $\theta^*$ is varied in a step as shown in FIG. 5A or gradually as shown in FIG. 5B for calculating the step response or ramp response of the deviation $\theta_d$. In this case, since the step response of the deviation $\theta_d$ is shown by a curve $I_s$ shown in FIG. 6A, and since the master servosystem 11 and the slave servosystem 12 are of the so-called I type servosystems, the outputs of both servosystems can finally follow the stepped target value $\theta^*$ without any compensation. Consequently, it is sure that the deviation $\theta_d$ also becomes zero. On the other hand, the ramp response of deviation $\theta_d$ is shown by curve $I_R$ in FIG. 6B meaning the presence of a steady deviation.

The proportional operation of the compensation system 13, that is the transfer function $G_s$ thereof is set to be $$G_c(s) = K_p \quad (3)$$

and the constant $K_p$ is set to be 0.3 for calculating the step response and the ramp response. In this case, as shown by curve $II_s$ in FIG. 6A, the step response of deviation $\theta_d$ attenuates to zero at a speed faster than that of a case where compensation is not made. The ramp response of deviation $\theta_d$ is shown by curve $II_R$ in FIG. 6B which shows a decrease in the steady deviation when compared with a case wherein no compensation is made.

Figure 8:
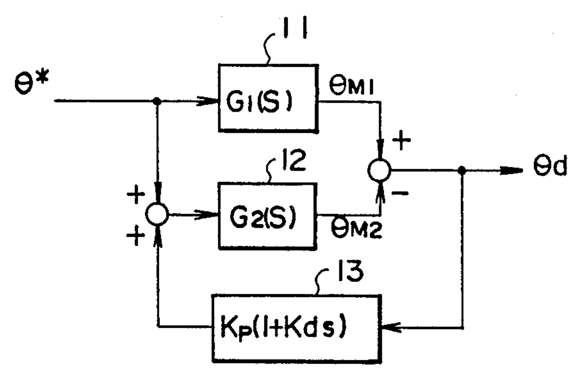
FIG. 8 is a block diagram showing a case wherein the compensation system is constituted by a proportionality element and a differentiating element.
Figure 9A:
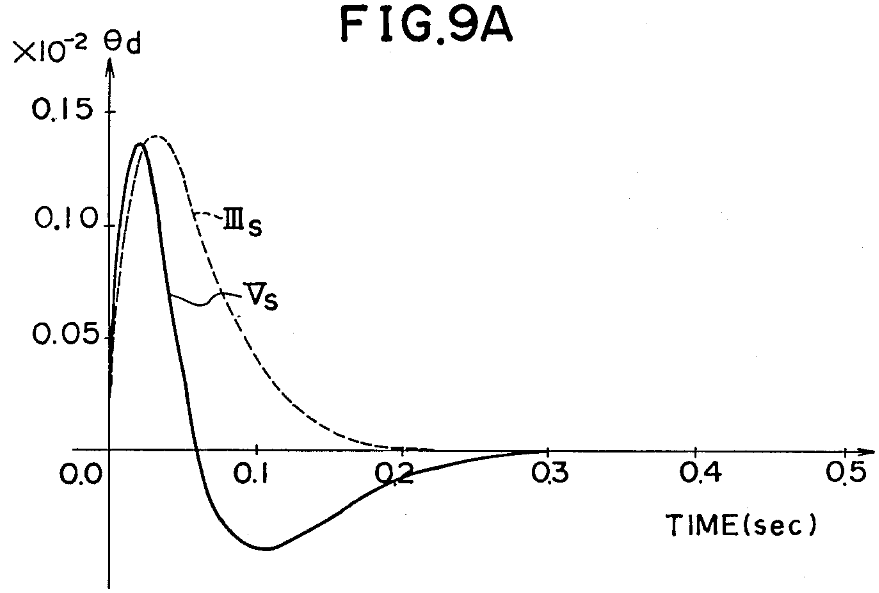
FIG. 9A is a graph showing one examples of the stepped response.
Figure 9B:
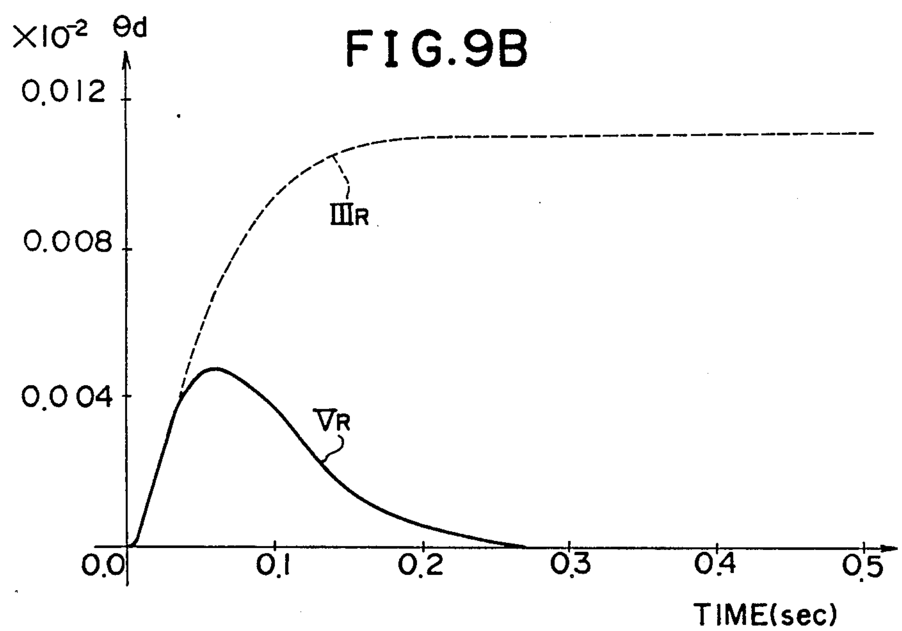
FIG. 9B is a graph showing one examples of the ramp response.

As shown in FIG. 8, where the compensation system 13 performs a proportionality operation and a differentiating operation, in other words, where the transfer function $G_c(s)$ of the compensation system 13 is expressed by an equation:

$$G_c(s) = K_p(HK_d \cdot s)$$

and where it is set that $K_p = 100$ and $K_d = 0.015$, the step response and the ramp response of deviation $\theta_d$ are calculated in the same manner. In this case, as shown by curve $III_s$ in FIG. 9A, the step response attenuates to zero at a speed much faster than the two examples described above. Comparing the deviations $\theta_d$ shown in FIGS. 6 and 9 (represented by ordinates), it will be noted that the peak value of deviation $\theta_d$ shown in FIG. 9 is smaller than that shown in FIG. 6 by two orders of magnitude. The ramp response is shown by curve $III_R$ in FIG. 9B and the peak value of steady deviation $\theta_d$ is also smaller than that shown in FIG. 6 by about two orders of magnitude.

Figure 10:
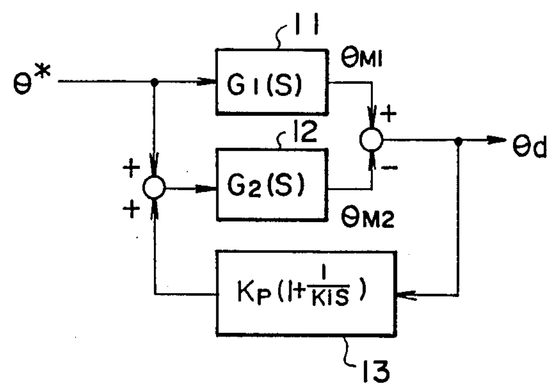
FIG. 10 is a block diagram showing a case wherein the compensation system is constituted by a proportionality element and an integrating element.
Figure 11A:
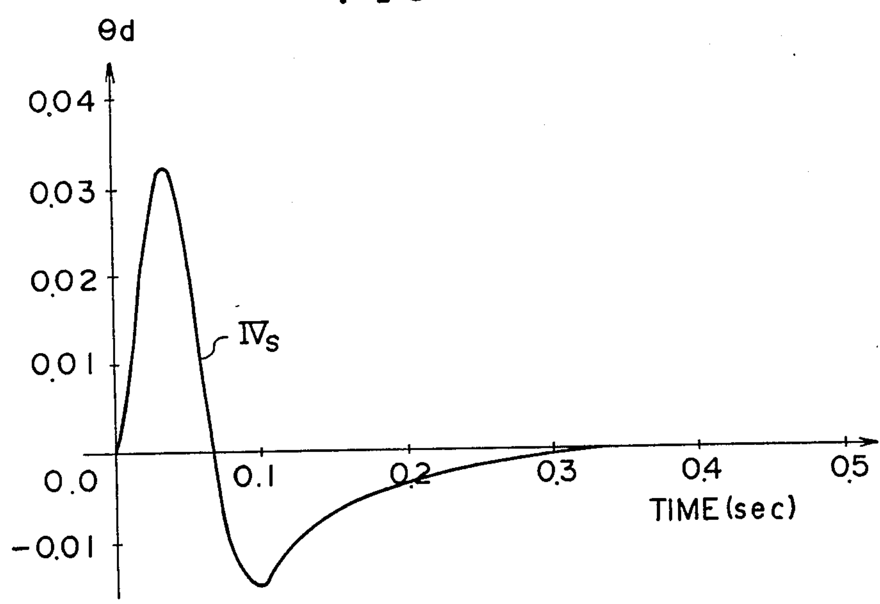
FIG. 11A is a graph showing one example of the stepped response.
Figure 11B:
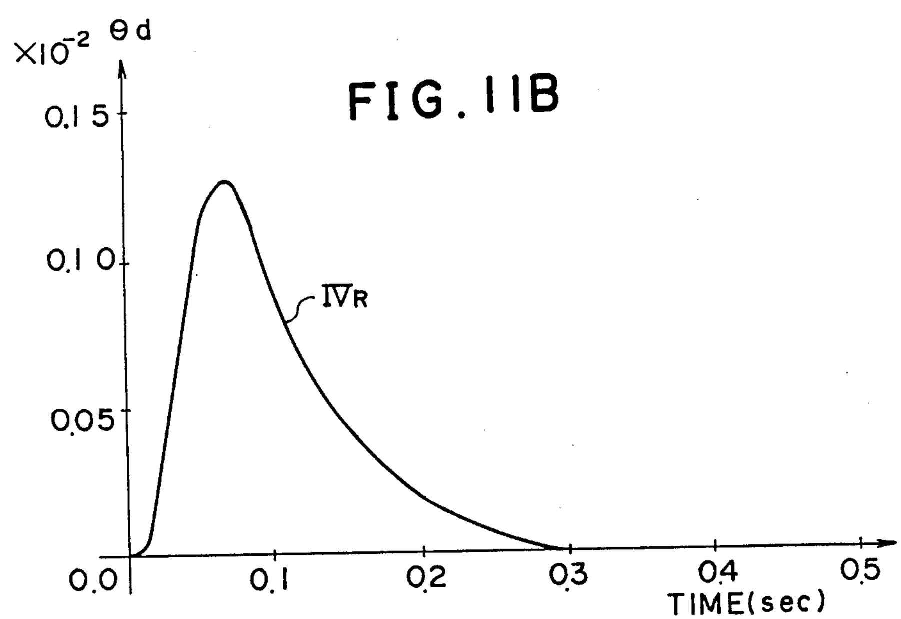
FIG. 11B is a graph showing one example of the ramp response.

As shown in FIG. 10, when the compensation system 13 comprises a proportionality element and an integrating element, in other words, where the transmission function $G_c(s)$ of the compensation system is expressed by an equation:

$$G_c(s) = K_p\left(1 + \frac{1}{K_i \cdot s}\right) \quad (5)$$

and when the constants $K_p$ and $K_i$ are set as $K_p = 4.0$ and $K_i = 20.0$, then the step response and the ramp response of deviation $\theta_d$ are calculated and the results are shown by FIGS. 11A and 11B, respectively. Comparing this embodiment with the embodiment in which the compensation system comprises only the proportionality element, it can be noted that the peak value of the step response reduces to one half, and the peak value of the ramp response decreases by one order of magnitude. Moreover, this peak value attenuates to substantially zero in about 0.3 sec. meaning a small steady deviation.

Figure 12:
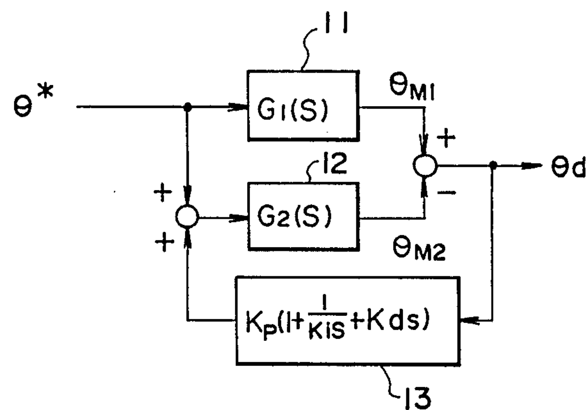
FIG. 12 is a block diagram showing a modified compensation system made up of a proportionality element, an integrating element and a differentiating element.

As above described, in a case wherein a proportionality element and a differentiating elements are provided, the peak values of the deviation $\theta_d$ of both the step response and the ramp response are much smaller than a case which includes only a proportionality element, whereas in the case wherein the proportionality element and the integrating elements are provided there is an advantage that there is no steady deviation even for the ramp response. Consequently, when the compensating system 13 is constituted by a proportionality element, an integrating element and a differentiating element as shown in FIG. 12, in other words, when the transmission function $G_1(s)$ of the compensation system 13 is expressed by an equation:

$$G_1(s) = K_p\left(1 + \frac{1}{K_i \cdot s} + K_d \cdot s\right) \quad (6)$$

and when the step response and the ramp response of the deviation $\theta_d$ are calculated after setting the constants or parameters $K_p$, $K_i$ and $K_d$ as $K_p=100$, $K_i=20.0$ and $K_d=0.01$, the calculated step response and the ramp response are shown by curves $V_s$ and $V_R$ in FIGS. 9A and 9B respectively. These curves show that the peak values of the step response and the ramp response are comparable with those of a case wherein the compensation system 13 is constituted by a proportionality element and a differentiating element. In addition, the steady deviation of the ramp response is zero.

Equation (6) is a general equation for a case wherein the compensation system comprises a proportionality element, an integrating element and a differentiating element. When either one or more of the parameters $K_p$, $K_i$ and $K_d$ are set to zero, the compensation system will comprise all of the proportionality element, the integrating element and the differentiating element; or the proportionality element and the integrating element; or the proportionality element and the differentiating element; or any one of these elements. Where $K_p=0$ the transfer function $G_d(s)$ becomes zero. These parameters can be set manually or by an automatic setter, not shown, connected to the compensation system as will be described later.

The transmission function $G_d(s)$ between the target value $\theta^*$ and the deviation $\theta_d$ is calculated as follows:

$$G_d(s) = \frac{G_1(s) - G_2(s)}{1 + G_2(s)G_c(s)} \quad (7)$$

From equations (1) and (2), we obtain:

$$\lim_{s \to 0}\{G_1(s) - G_2(s)\} = \frac{\beta_1}{\beta_1} - \frac{\beta_2}{\beta_2} = 0 \quad (8)$$

Where the compensation system 13 contains an integrating element, since the transfer function $G_c(s)$ of the compensation system 13 is of the I type, we obtain:

$$\lim_{s \to 0} \frac{1}{1 + G_2(s)G_c(s)} \cdot \frac{1}{s} = \text{constant} \ldots \quad (9)$$

Accordingly, from equations (7)–(9) the steady deviation $$\lim_{s \to 0} s \cdot G_d(e) \frac{1}{s^2}$$

of $G_d(s)$ with respect to the ramp input becomes zero. More particularly, from equation (8) which holds when both the master servosystem 11 and the slave servosystem 12 can follow the stepped input without any steady deviation and equation (9) which holds when the compensation system 13 contains an integrating element, it can be noted that where the target value $\theta^*$ varies in the form of a ramp, the deviation $\theta_d$ is reduced to zero without any steady deviation, whereby the outputs of the master servosystem 11 and of the slave servosystem 12 are caused to coincide with each other.

As above described, the proportionality element functions to bring the positional deviation between the master servosystem 11 and the slave servosystem 12 close to zero, while the differential element not only rapidly responds to the variation in the positional deviation, but also functions to minimize the variation of the response. Furthermore, the integrating element functions to reduce to zero even a small positional deviation. When more than two elements are combined, it is possible to not only provide their combined effect but also to provide a new effect. For example, it is possible to improve the stability of the system and to increase the width of setting of parameters.

Figure 13:
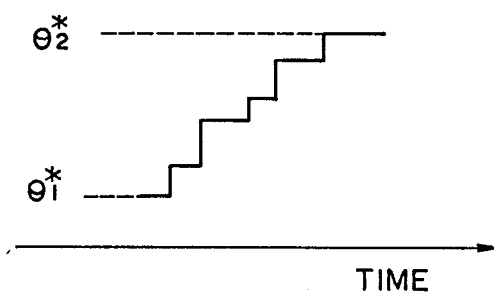
FIG. 13 is a graph showing a stepped variation of a target value of the rotation of the worktable of an actual machining center.

As shown in FIG. 13, the target deviation can be changed stepwisely from $\theta_1^*$ to $\theta_2^*$ during one revolution of the worktable 1 of an actual machining center. In this case, the pitch error and the backlash error are corrected at each step so that when the proportionality element, the integrating element and the differentiating element are all provided, a highly accurate servosystem can be obtained.

Figure 6A:
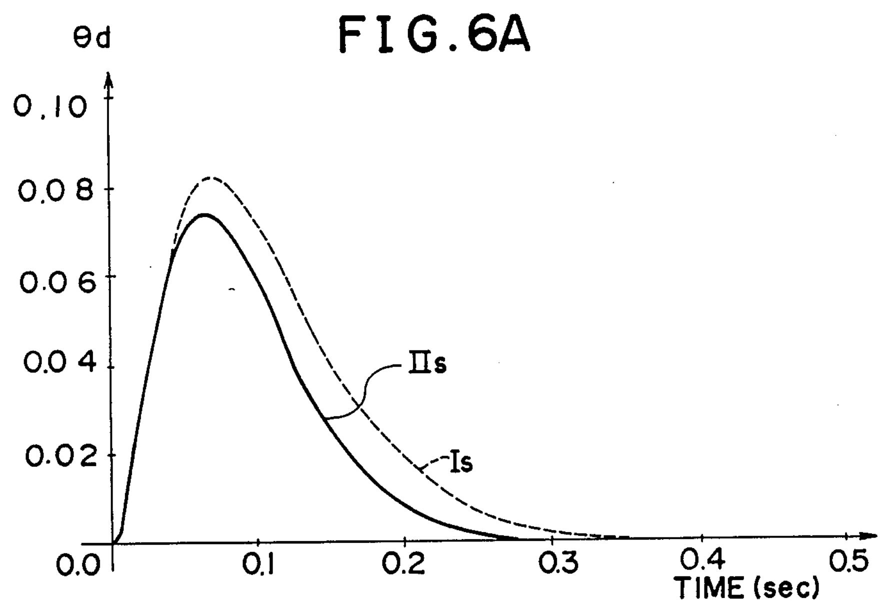
FIG. 6A is a graph showing one examples of the stepped response.
Figure 14:
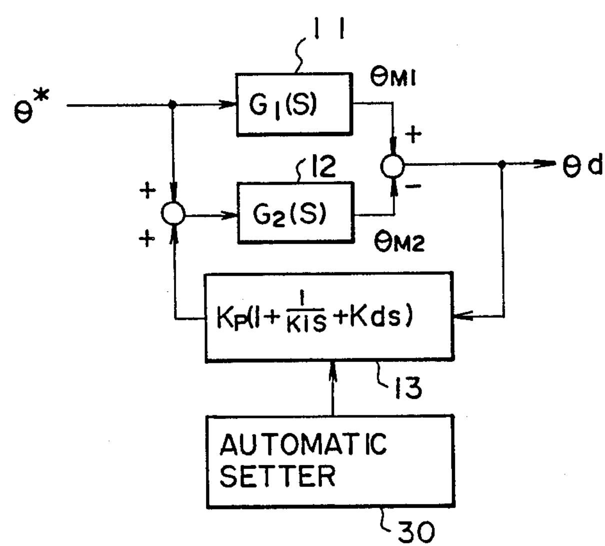
FIG. 14 is a block diagram showing a modification of FIG. 12, in which an automatic setter is added.

FIG. 14 is a block diagram obtained by rewriting FIG. 2 and adding an automatic setter 30. By varying the target value $\theta^*$ stepwisely as shown in FIG. 5A or gradually as shown in FIG. 5B, the step response or the ramp response of the deviation $\theta_d$ is calculated.

Where $K_p=K_i=K_d=0$, that is where no compensation is made, the step response of deviation $\theta_d$ is shown by curve $I_s$ in FIG. 6A. Since both the master servosystem 11 and the slave servosystem 12 are of the I type servosystem, the outputs of the servosystems 11 and 12 finally follow the stepped target value $\theta^*$ so that the deviation $\theta_d$ too becomes zero. In contrast, the ramp response of the deviation $\theta_d$ is shown by curve $I_R$ in FIG. 6B which shows the presence of the steady deviation.

Figure 6B:
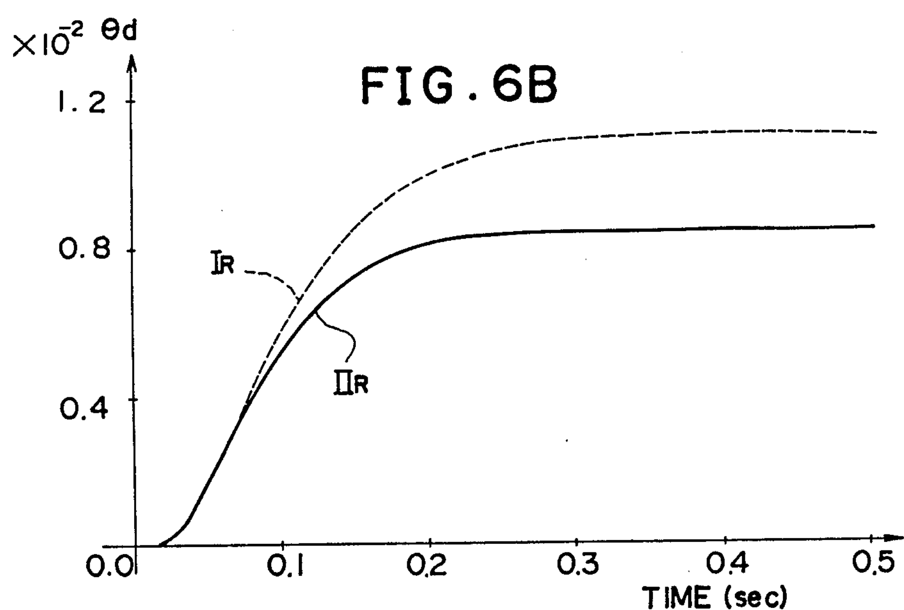
FIG. 6B is a graph showing one examples of the ramp response.
Figure 7:
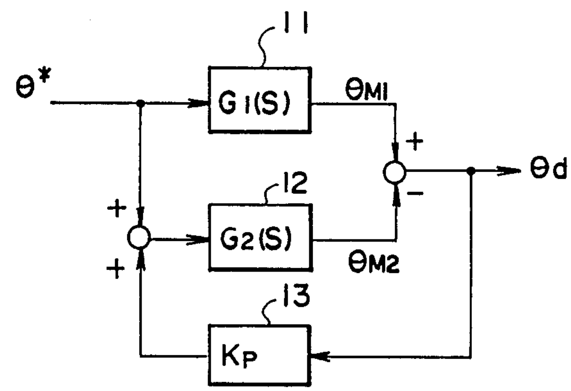
FIG. 7 is a block diagram showing a case wherein the compensation system is constituted by a proportionality element.

When the compensation system 13 is constituted by only the proportional element and when the parameter $K_p$ is set to be 0.3, the step response is shown by curve $II_s$ in FIG. 6A, the curve $II_s$ attenuating to zero faster than curve $I_s$. In this case, the ramp response of the deviation $\theta_d$ is shown by curve $II_R$ in FIG. 6B showing that the steady deviation is smaller than a case wherein no compensation is made.

Where $K_i=0$, that is the compensation system 13 is constituted by a proportionality element and a differentiating element and when it is set that $K_p=100$ and $K_d=0.015$, the step response is shown by curve $III_s$ in FIG. 9A, which attenuates to zero faster than the foregoing two examples. Moreover the peak value of the step response is smaller than two orders of magnitude. The ramp response is shown by curve $III_R$ in FIG. 9B which shows that the steady deviation is decreased by about two orders of magnitude than a case where no compensation is made.

Where $K_d=0$, that is the compensation system 13 is constituted by a proportionality element and an integrating element and when the parameters are set that $K_p=4.0$ and $K_i=20.0$, the step response and the ramp response are shown by curves shown in FIGS. 11A and 11B. When compared with the above described example in which the compensating system is constituted by only the proportionality element, the peak value of the step response is reduced to one half and the peak value of the ramp response decreases by one order of magnitude and attenuates substantially to zero within 0.3 sec., thus eliminating the steady deviation.

As above described, according to this invention, it is possible to cause the outputs of the two servosystems of a synchronous drive system to rapidly coincide with each other with a smaller error than a case not provided with a compensation system. Furthermore, it is possible to rapidly follow up not only a stepped variation but also a gradual variation of the target value.

What is claimed is:

1. A system for controlling a synchronous drive system of the type comprising a first servosystem and a second servosystem wherein it is necessary to cause outputs of said first and second servosystems to coincide with each other, wherein there are provided means for supplying a target value of a servosystem to said first and second servosystems respectively, a compensation system inputted with a difference between the outputs of said first and second servosystems, and means for inputting the sum of said target value and the output of said compensation system to said second servosystem, said compensation system being constituted by a proportionality element and a differentiating element.

2. The system according to claim 1 further comprising an automatic setter setting one or more parameters in said compensation system.

3. A system for controlling a synchronous drive system of the type comprising a first servosystem and a second servosystem wherein it is necessary to cause outputs of said first and second servosystems to coincide with each other, wherein there are provided means for supplying a target value of a servosystem to said first and second servosystems respectively, a compensation system inputted with a difference between the outputs of said first and second servosystems, and means for inputting the sum of said target value and the output of said compensation system to said second servosystem, said compensation system being constituted by a proportionality element and an integrating element.

4. A system for controlling a synchronous drive system of the type comprising a first servosystem and a second servosystem wherein it is necessary to cause outputs of said first and second servosystems to coincide with each other, wherein there are provided means for supplying a target value of a servosystem to said first and second servosystems respectively, a compensation system inputted with a difference between the outputs of said first and second servosystems, and means for inputting the sum of said target value and the output of said compensation system to said second servosystem, said compensation system being constituted by a proportionality element, and integrating unit and an differentiating element.

* * * * *